Figure 1:
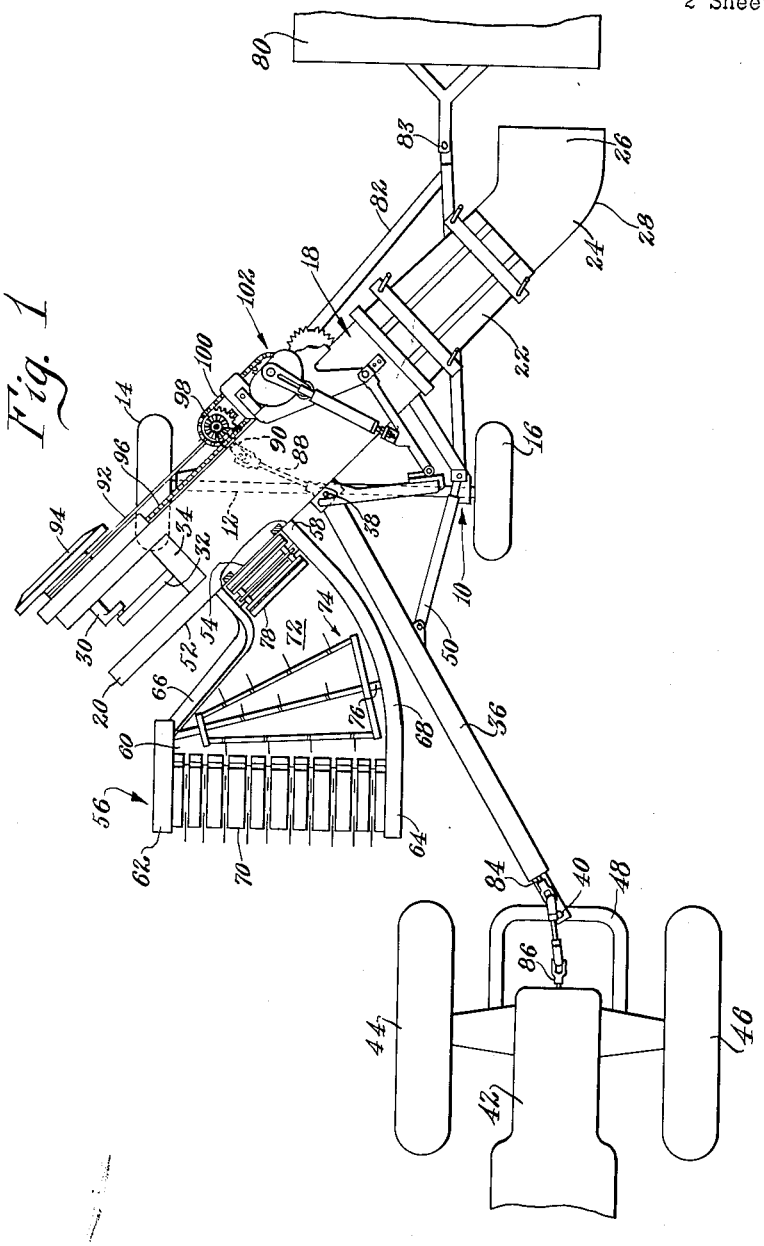

March 27, 1956

M. E. McCLELLAN 2,739,438

PICKUP AND BALER

Filed Oct. 26, 1953

2 Sheets-Sheet 1

INVENTOR.
M.E.McClellan
BY
Attorneys

March 27, 1956 M. E. McCLELLAN 2,739,438
PICKUP AND BALER
Filed Oct. 26, 1953 2 Sheets-Sheet 2

INVENTOR.
M. E. McClellan
BY
Attorneys

United States Patent Office 2,739,438
Patented Mar. 27, 1956

2,739,438
PICKUP AND BALER

Marcus E. McClellan, Ottumwa, Iowa, assignor to Deere Manufacturing Co., Dubuque, Iowa, a corporation of Iowa Application October 26, 1953, Serial No. 388,375

10 Claims. (Cl. 56—341)

This invention relates to an agricultural pickup baler and more particularly to improvements in the arrangement of the pickup and baling mechanism relative to the propelling vehicle and the bale-discharging means.

Up until the present, agricultural pickup balers may be considered to fall into two general classes: First the cross-mounted type in which the bale case is transverse to the line of travel and second the in-line type in which the bale case is parallel or along the line of travel. In the former, there are many advantages, since the pickup mechanism extends forwardly directly ahead of one end portion of the bale case and operates to pick up and transfer crops directly into the bale chamber. A reciprocating plunger or equivalent means forms bales and compels them to move laterally in a direction toward the side of the machine opposite the pickup means, at which point the bales are discharged either directly upon the ground or into means that immediately facilitates transfer of the discharge bales to a trailer. In the in-line type, the pickup means is alongside the fore-and-aft extending bale case and after the crops are picked up, their direction of travel must be changed at right angles to the line of pickup before they can be introduced into the bale chamber. The bales are formed by a longitudinally reciprocating plunger or similar means and as the bales are completed they are forced to the rear and discharged thereat either directly upon the ground or by some suitable means for effecting immediate transfer of the bales to a trailer. It will thus be seen that each of these balers has its advantages and disadvantages. In the cross-mounted type, it is an advantage to move the picked up crops directly into the bale chamber with a minimum of handling, which eliminates high leaf loss. In the in-line type, the abrupt change of travel of the crops before they are introduced into the bale chamber causes relatively high leaf loss and the crop ultimately baled does not have quite the nutrient value of the same crop baled by a cross-type baler. On the other hand, the discharge of bales from a cross-type baler is a little cumbersome, whether handled ultimately by a bale loader or immediately by transfer to a trailer, whereas these problems are of a considerably minor nature in the in-line type of baler.

Furthermore, although the distribution of weight as respects the line of draft is perhaps better in the in-line type, the over-all length makes it rather difficult to use the baler in fields in which the ground contour varies much above gentle rolling, whereas the cross-mounted baler lends itself better to rough fields but the considerable offsetting of the pickup means does not perhaps offer the best solution to the line of draft problem.

According to the present invention, it is a principal object to combine the advantages and eliminate the disadvantages of both types of balers by arranging the bale case on a line diagonal to the line of travel. This arrangement facilitates the relationship of the pickup means to the feed opening in the bale case, because, although the direction of travel of the picked up crops must be changed, the change is relatively slight and gentle and can be accomplished with little or no leaf loss. Moreover, although the lateral width of the baler may be increased, several of the line of draft problems are eliminated because the heavier parts of the machine are brought closer to the line of draft. At the same time, the over-all length of the machine is reduced. Still further, the discharge of bales is facilitated and the arrangement enables the use of a trailer connected to the baler in such manner as to be substantially directly behind the draft vehicle. It is a further object of the invention to provide an improved baler utilizing conventional design to as great an extent as possible and thereby eliminate radical and untried expedients. Therefore, a baler constructed according to the present invention may have low initial cost and yet possess all of the features desirable in a pickup machine.

The foregoing and other important objects and desirable features inherent in and encompassed by the invention will become apparent as a preferred embodiment of the invention is described in detail and illustrated in the following specification and accompanying sheets of drawings in which Fig. 1 is a plan view of the baler, with parts broken away, showing its relationship to a propelling vehicle and a trailing vehicle.

Figure 2:
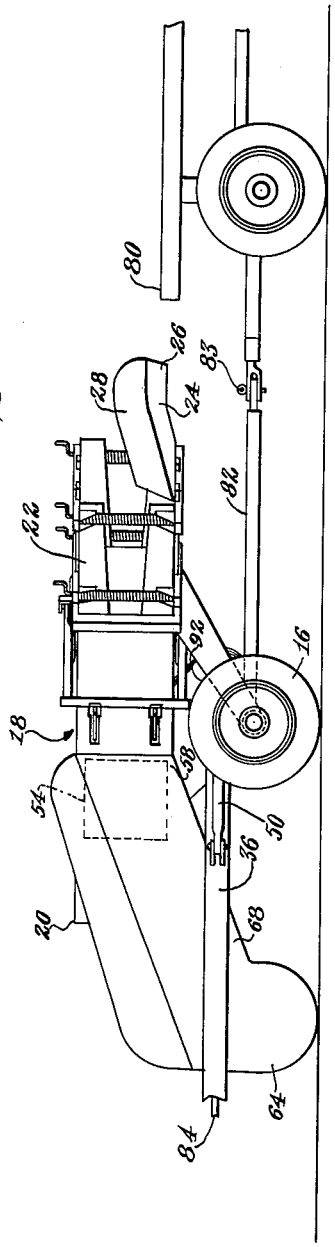

Fig. 2 is a side elevational view of the machine.

The baler comprises essentially a mobile frame 10 adapted to advance over a field in which crops have been previously cut and windrowed, as is conventional. The frame includes a transverse axle 12 on which are journaled first and second or right- and left-hand ground-engaging wheels 14 and 16. In the preferred embodiment, the wheels are coaxial on an axis normal to the line of advance. These wheels, for purposes of convenience, represent first and second or right- and left-hand opposite sides of the baler. The frame 10 supports thereon an elongated bale case 18 arranged diagonally as respects the line of travel and having a forward portion or front part 20 ahead of the wheel 14 and a rearward portion or part 22 behind the left-hand wheel 16. The rear part 22 may be in the form of a conventional bale case extension including means for regulating the density of bales formed in the chamber within the bale case 18. The bale case extension or rear part 22 terminates in a laterally and rearwardly directed bale-discharge member 24 in the form of a chute having a rearwardly directed end portion 26 which causes bales discharged from the bale case extension 22 to be delivered directly rearwardly along a line parallel to the line of advance. The outer wall of the member 24 may be curved, as at 28, which provides means for turning the diagonally discharged bales rearwardly as aforesaid.

The forward part of the bale case, heretofore designated by the numeral 20, journals a rotatable crankshaft 30 having a pitman connection 32 to a conventional plunger 34, the plunger in this case comprising means for forming bales in the bale chamber. Extending forwardly from the baler frame 10 is a diagonally directed draft means or member 36 preferably pivoted to the axle at 38 and having a forward hitch point 40 for connection to a draft vehicle. The draft vehicle has here been shown as the rear portion of a typical agricultural tractor having a longitudinal body 42 supported on traction wheels 44 and 46 and including a drawbar 48 to which a draft connection is made to the draft member 36 at the hitch point 40. In operating position (as shown in Fig. 1) the tractor is offset to the left relative to the longitudinal center line between the wheels 14 and 16 and the draft member 36 is releasably maintained in this position by a releasable brace 50 connected between the draft member and the left-hand end portion of the axle 12. This brace may be released so that the draft member or tongue 36 may be swung to the right or in a clockwise direction as viewed in Fig. 1, thus placing the hitch point 40 more nearly in longitudinal alinement with the fore-and-aft center line between the wheels 14 and 16, enabling the over-all width of the machine to be narrowed for transporting purposes. Further details in this respect will be set forth below.

The bale case 18 is made up of a plurality of walls, one of which is an upright front wall 52. This wall faces forwardly and to the left, since it is parallel to the principal axis of the diagonally disposed bale case. This wall has therein a feed opening 54 which of course faces forwardly and to the left. A portion of the top wall of the bale case has been broken away in Fig. 1 to illustrate generally the location of this opening. Pickup or crop-gathering means, designated generally by the numeral 56, serves to gather previously harvested and windrowed crops from the field and to deliver them to the bale case via the feed opening 54. The crop-gathering means has a rear part 58, which is relatively narrow on the order of the relatively small lateral width of the feed opening 54, and a relatively wider forward part 60, which has right- and left-hand sides 62 and 64 spaced apart on the order of the spacing of the inner planes of the wheels 14 and 16. Moreover, the sides 62 and 64 of the gathering means preferably lie respectively just inwardly of these planes of the wheels. Stated otherwise, the left-hand side 64 of the gathering means lies to the right of the plane of the right-hand traction wheel 44, thus further emphasizing the offset relationship between the baler and the tractor so that the tractor may travel over the field without running over windrows. Because of the materially greater width of the front part 60 of the gathering means relative to the narrow width of the rear part 58, the gathering means includes right- and left-hand side walls 66 and 68 that converge rearwardly from the sides 62 and 64 to opposite sides of the feed opening 54. The front part of the crop-gathering means includes a crop-gathering element in the form of a conventional pickup device 70 which operates to pick up the crops and transfer them rearwardly to a rearwardly and upwardly inclined floor 72. The floor in this case serves as crop-conveying means extending rearwardly from the pickup device 70 to the feed opening 54 and is in crop-receiving relationship to the pickup means and in crop-transfer of crop-delivery relationship to the feed opening.

As part of the crop-gathering means, there is included a feeder for facilitating the transfer of crops from the pickup device 70 to the feed opening 54. This feeder takes the form of a rotatable conical device 74 mounted on a shaft 76 that has its principal axis disposed generally transverse to the line of travel. Specifically, this axis is at an angle to the axis of the pickup device 70 as well as being at an angle or non-parallel to the principal axis of the diagonal baler. Because of the converging walls 66 and 68, the left-hand wall 68 is longer and is curved as illustrated in Fig. 1 and the conical feeder accommodates the particular shape of the crop-gathering means. Thus, the small end of the feeder is at the right and the large end of the feeder is at the left. As further means for facilitating the transfer of crops from the crop-conveying means 72 to the bale chamber via the feed opening 54, there is a rotatable device 78 mounted just outside the feed opening or in the narrow rear part 58 of the crop-gathering means or device 56. It will thus be seen that although the line of travel of the crops changes somewhat from the straight line of the windrow in which they are originally lying, the change is relatively gentle and the feeding mechanism handles the crops without a material loss of leaves.

As the bales are formed in the bale case, succeeding bales are moved to the rear and to the left for discharge through the bale case extension 22 and ultimate delivery out onto the bale-discharge member 24. In order to transfer bales directly from the member 24 to a trailer or wagon, such as designated generally by the numeral 80, the baler has a rear hitch means 82 providing a rear hitch point 83 substantially in fore-and-aft alinement with the hitch point of the baler to the tractor, whereby the trailer 80 may be drawn directly behind the discharge end 26 of the member 24, and a person standing on the front of the trailer may readily reach discharged bales, since the member 24 is at a height enabling ready achievement of this purpose.

The draft member 36 may be of the hollow type incorporating therein a propeller shaft, only the forward end of which appears at 84 and which is connected in any appropriate manner to a power take-off shaft 86 conventionally provided as part of a tractor. The drive is ultimately transmitted via appropriate shafting 88 and 90 and an endless belt 92 to a flywheel 94 on the plunger crankshaft 30. From this point, a chain drive 96 transmits power to suitable gearing 98 from which drive is taken at 100 to any conventional type of tying mechanism, designated generally by the numeral 102. Since any type of tying mechanism may be used, the details thereof are deemed to be without significance here.

From the foregoing description, it will be seen that a compact and efficient organization has been exploited in the design of a baler characterized in that the bale case is disposed diagonally to the line of travel, thus facilitating the location and arrangement of the pickup means relative to the bale case, as well as the relationship of the entire machine to the propelling vehicle and the trailing vehicle. As already outlined, this arrangement combines all of the features and advantages of the cross-mounted and the in-line types of balers without including any of their disadvantages.

Various modifications may, of course, be made in the details of arrangement illustrated, all of which may be achieved without departing from the spirit and scope of the invention.

What is claimed is:

1. An agricultural baler, comprising: a mobile frame adapted to advance over a field and including a pair of laterally spaced ground-engaging wheels coaxial on an axis transverse to the line of advance; a bale case supported on the frame and positioned diagonally as respects the wheel axis, having a forward end portion ahead of one wheel and a rear, bale-discharge end behind the other wheel; crop-gathering means supported by the frame ahead of the wheel axis and between the forward end portion of the bale case and said other wheel, said means having a transverse crop-collecting element parallel to the wheel axis and a crop-conveying element in crop-receiving relationship to the crop-collecting element and extending rearwardly therefrom and thence laterally toward and in crop-delivery relationship to the bale case.

2. The invention defined in claim 1, in which: the forward portion of the bale case has an upright wall facing toward said other wheel and said wall has a feed opening therein; and the crop-conveying element is in crop-delivery relationship to the bale case.

3. The invention defined in claim 1, in which: the rear, bale-discharge portion of the bale case has a bale-delivery member positioned laterally outwardly of said other wheel, said bale-delivery member has a portion directed rearwardly to discharge bales parallel to the line of travel of the frame, and said bale-delivery member includes means associated with the bale case for turning bales delivered diagonally from the bale case onto the rearwardly directed portion of the bale-delivery member.

4. The invention defined in claim 1, in which: the forward portion of the bale case has an upright wall facing toward said other wheel and said wall has a feed opening therein having a dimension lengthwise of the bale case materially narrower than the transverse width of the crop-collecting element; the crop-conveying element converges rearwardly and laterally from the crop-collecting element to the feed opening; and the crop-gathering means includes a rotatable conical feed means having its axis of rotation crosswise of the line of travel and its smaller end toward the bale case and its larger end toward said other wheel.

5. The invention defined in claim 1, including: draft means connected to the frame and extending diagonally forwardly from the frame to a front hitch point ahead of said other wheel and laterally outwardly of the plane of said other wheel for connection of the frame in laterally offset relation to a draft vehicle; and a trailer hitch connected to the frame and extending rearwardly to a rear hitch point rearwardly of and substantially in fore-and-aft alinement with the front hitch point.

6. An agricultural baler, comprising: a mobile frame adapted to advance over a field; a bale case supported on the frame and positioned diagonally as respects the line of travel, having a forward crop-receiving portion disposed toward one side of the frame and a rear, bale-discharge portion disposed toward the other side of the frame; crop-gathering means supported by the frame ahead of the bale case and between the forward and rear portions of the bale case, said means having a transverse crop-collecting element normal to the line of travel and a crop-conveying element in crop-receiving relationship to the crop-collecting element and extending rearwardly therefrom and thence laterally toward and in crop-delivery relationship to the forward portion of the bale case.

7. The invention defined in claim 6, in which: the forward portion of the bale case has a diagonal upright wall facing forwardly and laterally and said wall has therein a feed opening of relatively small lateral dimension; the crop-gathering means has a correspondingly narrow rear part adjoining the opening, said means extending forwardly and laterally generally normal to the bale case and then diverging forwardly to a relatively transversely wide front part; the crop-collecting element is disposed across the front part; and the crop-conveying element extends from said front part to the aforesaid rear part.

8. The invention defined in claim 7, in which: a rotatable conical crop feeder is journaled on the crop-gathering means just behind the crop-collecting element and on an axis forming an acute angle to the line of travel, and said feeder has its smaller end laterally proximate to the forward portion of the bale case.

9. An agricultural pickup baler, comprising: a mobile frame adapted to advance over a field and having first and second opposite sides spaced transversely of the line of advance and first and second ground-engaging wheels supporting the frame respectively at said sides; a bale case carried by the frame and having a front part proximate to the first side of the frame and ahead of the first wheel and a rear part proximate to the second side of the frame and behind the second wheel, said rear part including a bale-discharge member directed rearwardly and outside the plane of the second wheel for delivering bales rearwardly and parallel to the line of advance, said front part having crop-receiving means inwardly of the plane of the first wheel and ahead of said first wheel; crop-gathering means extending forwardly from the crop-receiving means to a front end portion in a position normal to the line of advance, said front end portion having first and second opposite sides lying respectively just inwardly of the planes of the first and second wheels; a crop-collecting element across said front end portion; and crop-conveying means on the crop-gathering means and extending rearwardly from said element to the aforesaid crop-receiving means.

10. An agricultural pickup baler, comprising: a mobile frame adapted to advance over a field and having first and second opposite sides spaced transversely of the line of advance and first and second ground-engaging wheels supporting the frame respectively at said sides; a bale case carried by the frame and having a front part proximate to the first side of the frame and ahead of the first wheel and a rear part proximate to the second side of the frame and behind the second wheel, said rear part including a bale-discharge member directed rearwardly and outside the plane of the second wheel for delivering bales rearwardly and parallel to the line of advance, said front part having crop-receiving means inwardly of the plane of the first wheel and ahead of said first wheel and including a relatively laterally narrow feed opening facing toward said plane of the second wheel; crop-gathering means having a relatively narrow rear part adjoining and in crop-transfer relationship to said opening and a relatively laterally wide front part ahead of the bale case and normal to the line of advance, said means having first and second side walls extending forwardly from the rear part at said feed opening and diverging to said front part and lying thereat respectively just inwardly of the planes of the wheels; and movable crop-feeding means carried by the crop-gathering means intermediate said front and rear parts and shaped to conform to the divergence of the side walls.

References Cited in the file of this patent
UNITED STATES PATENTS

| | | |
|---|---|---|
| 2,252,376 | Hyman | Aug. 12, 1941 |
| 2,318,229 | Jones | May 4, 1943 |
| 2,585,891 | Worsdell | Feb. 12, 1952 |